United States Patent
Kantola et al.

(10) Patent No.: US 7,661,920 B2
(45) Date of Patent: Feb. 16, 2010

(54) SYSTEM AND A METHOD FOR MANIPULATING A CASSETTE USED IN STORAGE BY MEANS OF A TRANSFER DEVICE

(75) Inventors: Juhana Kantola, Kangasala (FI); Tero Rapila, Espoo (FI); Teppo Halkola, Hyvinkää (FI); Vesa Raevaara, Tampere (FI); Jyrki Kortesmäki, Nokia (FI)

(73) Assignee: Fastems Oy AB, Tampere (FI)

( * ) Notice: Subject to any disclaimer, the term of this patent is extended or adjusted under 35 U.S.C. 154(b) by 562 days.

(21) Appl. No.: 11/094,149

(22) Filed: Mar. 31, 2005

(65) Prior Publication Data
US 2005/0232730 A1    Oct. 20, 2005

(30) Foreign Application Priority Data
Apr. 2, 2004    (FI)    ................... 20045117

(51) Int. Cl.
*B65G 1/00* (2006.01)
(52) U.S. Cl. ............... 414/280; 414/281; 414/286; 414/807; 414/814
(58) Field of Classification Search .......... 414/814, 414/280, 281, 286, 807
See application file for complete search history.

(56) References Cited

U.S. PATENT DOCUMENTS

| | | | | |
|---|---|---|---|---|
| 2,665,019 A | * | 1/1954 | Lorimer | 414/792.8 |
| 4,010,856 A | | 3/1977 | Anderson | |
| 4,159,060 A | * | 6/1979 | Buse | 414/608 |
| 4,563,120 A | * | 1/1986 | Josserand | 414/273 |
| 4,615,429 A | * | 10/1986 | Arase | 198/456 |
| 4,815,921 A | * | 3/1989 | Yamamoto et al. | 414/331.18 |
| 4,856,956 A | * | 8/1989 | Zur | 414/280 |
| 4,861,223 A | * | 8/1989 | Olson | 414/661 |
| 5,015,139 A | * | 5/1991 | Baur | 414/281 |
| 5,213,463 A | | 5/1993 | Rothlisberger et al. | |
| 5,363,258 A | * | 11/1994 | Coles et al. | 360/92.1 |
| 5,551,823 A | * | 9/1996 | Maruyama | 414/280 |
| 5,626,454 A | * | 5/1997 | Tokiwa et al. | 414/280 |
| 5,810,540 A | * | 9/1998 | Castaldi | 414/280 |

(Continued)

FOREIGN PATENT DOCUMENTS

AT    341429 B    2/1978

(Continued)

*Primary Examiner*—Michael S Lowe
(74) *Attorney, Agent, or Firm*—Venable LLP; Eric J. Franklin

(57) ABSTRACT

A method and a storage and manipulation system for manipulating and transferring cassettes used for storage. The system includes a rack for storing cassettes. The rack includes supports on which the cassette rests. A transfer device includes a slide, onto which the cassette can be transferred. The slide includes a lifting and lowering movement. The transfer device also includes grippers that grip the cassette and moving it onto or off the slide. The slide can be placed underneath the front part of the cassette and, by a lifting movement, elevate the front part of the cassette such that the cassette can be transferred along the support onto the slide. A rear part of the cassette is simultaneously supported by the support. The slide can also lower the front part of the cassette onto the support when the rear part of the cassette is transferred onto the support of the rack.

7 Claims, 4 Drawing Sheets

U.S. PATENT DOCUMENTS

| | | | |
|---|---|---|---|
| 6,619,902 B1 * | 9/2003 | Castaldi et al. | 414/280 |
| 6,997,665 B2 * | 2/2006 | Bouche et al. | 414/280 |

FOREIGN PATENT DOCUMENTS

| | | |
|---|---|---|
| DE | 4339056 A1 | 5/1995 |
| EP | 0116126 A1 | 8/1984 |
| EP | 0379688 A1 | 8/1990 |
| EP | 0405471 A1 | 1/1991 |
| EP | 0500065 A1 | 8/1992 |
| EP | 0 749 915 B1 | 2/2002 |
| FR | 2138491 | 1/1973 |
| FR | 2705955 | 12/1994 |
| JP | 59124603 | 7/1984 |

\* cited by examiner

SYSTEM AND A METHOD FOR MANIPULATING A CASSETTE USED IN STORAGE BY MEANS OF A TRANSFER DEVICE

BACKGROUND OF THE INVENTION

It is known that, for example, automatic flexible manufacturing systems and automatic storage systems involve the feeding of materials, sheets and work pieces for machining, storing or other handling. The work pieces are typically placed on various bases, trays or pallets. Material sheets of various sizes can also be placed in various cassettes which are used as transport supports and in which the materials can also be stored.

Typically, the system also comprises various automatic lift and transfer devices which transfer work pieces in the system, to be processed further or to be stored in a storage rack, and back. Lift and transfer devices include, for example, stacker cranes that handle cassettes, bases, trays, pallets or work pieces and comprise suitable devices, such as transfer forks, telescopic forks, lifting mechanisms, grippers, or the like, particularly for moving bases and cassettes to the stacker crane and back to the rack. Other lift and transfer devices, which are equipped with the above-mentioned devices, if necessary, include transfer devices operating at vertical storages and possibly moving in the vertical direction only, or transfer devices which move in the horizontal direction only and supply cassettes from loading stations or from feeding points of the system into other locations of the system, between locations in a manufacturing system, or into a storage. In a stacker crane, for example, the devices are normally placed in a lifting carriage which moves in the vertical frame structure of the stacker crane, driven by, for example, a cable drive or a chain drive. The lift and transfer device is normally arranged onto the floor level, in a driving carriage which typically moves on the support of rails, normally between long sets of racks. In other lift or transfer devices, these devices are placed, for example, on top of a carriage or sledge moving in various ways.

The lift or transfer devices also transfer pieces to various manufacturing stations with automatic manipulating devices of their own, especially for manipulating a pallet. The lift or transfer device systems are automatically controlled in ways known as such by means of a control program stored in control means, into which control program is entered the information needed, for example, about the pieces to be manipulated, the storage locations and the desired transfers or transfer locations.

When e.g. metal plates are stored in cassettes, the weights of the cassettes increase, and particular attention must be paid to the way in which the cassette is moved from the supports of the rack to the transfer device, for example a lifting carriage. According to FR 2705955, pieces to be collected are placed on bases which are pulled by means of a gripper from a rack into a stacker crane, both being equipped with rolls on which the base moves. However, the problem is that the stacker crane and the base are not precisely at the same height, wherein the box hits the rolls of the stacker crane when the stacker crane is higher than the rack. During and at the end of the transfer, the cassette also moves in a swinging manner on the rolls. Further, document DE 4339056 A1 presents the transfer of bases into a stacker crane, which also requires precise mutual positioning to prevent collisions or strong swingings of the base. A gripper is presented in FR 2138491, in which the base is equipped with rolls and the rack is provided, at corresponding locations, with brackets, along which the base rolls. Also in this case, the transfer of the wheels from the bracket onto the transfer device is critical, and problems are caused by the collision of the wheels with the brackets of the transfer device or by their falling between the bracket of the rack and the transfer device. If the base is equipped with wheels, problems include particularly the collision of the foremost wheel with the structures of the transfer device as well as the collision of its front edge with the idlers of the transfer device. Another problem is the return of the rearmost wheel of the support onto the brackets of the rack.

The collision of the box with the structures of the stacker crane can be easily perceived from EP 0116126 A1 and it may be acceptable in the case of boxes with a light weight, but as the weight of the bases and the materials increase, the force effects caused by collisions are great, causing noise and damaging the structures, thereby increasing the need for repair and maintenance. Heavy structures to be particularly mentioned include cassettes intended for the manipulation and storage of steel plates. Also document EP 0379688 A1 requires precise positioning in the correct location, which may be even impossible if the cassettes are heavy, because the structures may yield, move or be displaced as well, due to the heavy loads.

SUMMARY OF THE INVENTION

The other, dependent claims present some preferred embodiments of the invention.

One idea of the invention is to utilize two successive lifting movements of the transfer device or the lifting carriage of the stacker crane when e.g. a cassette is taken to the support of the lifting carriage of the transfer device or another corresponding elevating frame structure, wherein the transfer is smooth. Furthermore, lowering movements are utilized when the cassette is lowered back to the support of the rack. Another idea is that the front part of the cassette is taken directly onto the lifting carriage, by using the vertical movement of the lifting carriage, after which the cassette is gripped and pulled onto the lifting carriage. In this context, use is made of support rolls in the lifting carriage and/or in the front part of the cassette. Another idea is that a lifting movement is used before the cassette is transferred completely onto the support of the lifting carriage, when it is still supported by the rack. Thus, the rear part of the cassette is provided with a support roll which is lifted off the support of the rack and will thus not roll over gaps. After the lifting, the cassette is pulled entirely onto the lifting carriage.

Another advantage of the invention is to keep the structures simple, wherein the number of the cassettes and/or support rolls can be minimized, but still allowing a way of transfer with little friction. In particular, it becomes easier to stop the stacker crane at the correct height, because the requirement of precision is significantly reduced, and the movements of lifting and lowering the stacker crane are even used to facilitate the transfer of the load into the stacker crane and back to the rack.

It becomes possible to manipulate even heavy loads, and the effect of the loading changes caused by them will not affect the capacity of the lift or transfer device to transfer the cassette or to keep the correct height level and position of the stacker crane. At the same time, the precision requirements for the installation of the rack system are reduced, as the transfer device does not need to be precisely positioned at a given height.

One particular embodiment of the cassette has the advantage that there is no need to provide the rack system with holes, stoppers, arresters or other equipment to lock the cassette in its position. Even though the rear end of the cassette is provided with an idler which is allowed to roll, the cassette cannot move from its position, because the cassette, supported by its front part, rests in the rack. The front part is also equipped with an idler, but this does not rest on a bracket.

BRIEF DESCRIPTION OF THE DRAWING

In the following, the invention will be described in more detail with reference to the appended drawings, in which.

DETAILED DESCRIPTION OF THE INVENTION

Figure 1:
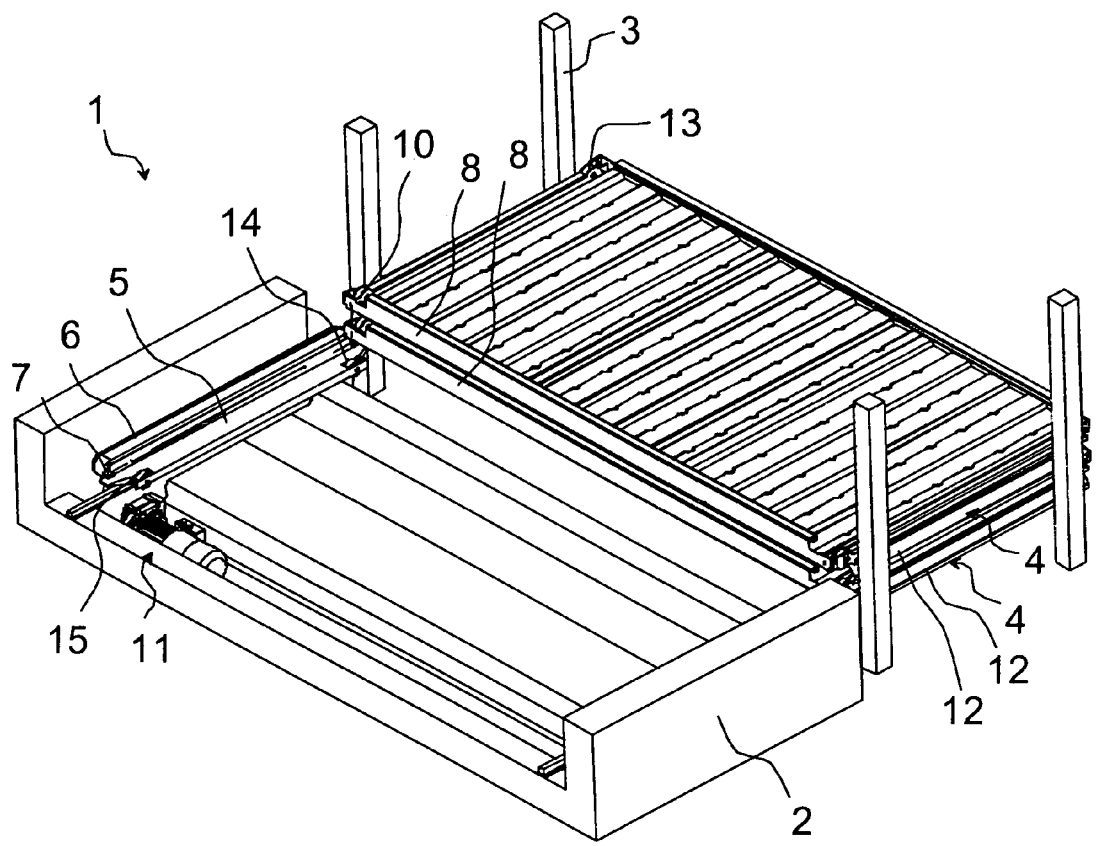
FIG. 1 shows the total system in a simplified view, wherein a rack, a cassette and a transfer device, such as a lifting carriage, are visible.

FIG. 1 shows the lifting carriage or the frame structure 2 of a transfer device 1, arranged to be lifted and lowered. In a particular embodiment of the invention, it is a stacker crane 1 with its lifting carriage 2. In another embodiment, the elevating structure is not the frame structure 2 but a pair of slides 5 which supports a cassette 8 and onto which the cassette is pulled. In the following description, an elevating and descending lifting carriage 2 will be used as an example. In FIG. 1, both the lifting carriage 2 of the transfer device 1 and two storage levels 4 of a rack 3 are illustrated as a simplified structure. In the case of the stacker crane 1, it is a stacker crane of prior art which moves in a way known as such either at one set of racks or in an aisle between two sets of racks. The structure of the set of racks 3 can be implemented and dimensioned in a variety of ways which are known as such from the design of warehouses. The aisles and the sets of racks are parallel to a driving rail for the stacker crane on the floor, and the sets of racks typically extend almost to the level of the upper guide rail for the stacker crane. The upper end of the stacker crane is supported against the guide rail. The racks are normally divided into several vertical rows and horizontal rows.

The frame of the stacker crane may be, for example, a beam structure which is not shown in the figure but which is provided with the necessary guides, to which the lifting carriage 2 of FIG. 1 is connected in a way known as such so that it can move up and down. The vertical movement of the other transfer devices can also be implemented by means of said beam structure. In the case of the stacker crane, the beam structure is connected onto the driving carriage which, in turn, is responsible for transferring the whole stacker crane back and forth along the rail on the floor. The movement in the direction of the aisle can also be made by wheels. The driving carriage also drives the crane under control to a given location, at a given speed, and following a given procedure. The driving carriage can also be applied in the case of other transfer devices moving in the horizontal direction.

The driving carriage is provided, for example, with the necessary sets of wheels by which it moves on the rail on the floor, and the upper end of the frame of the stacker crane, in turn, is provided with e.g. wheels which are supported against the guide rail and which keep the stacker crane upright. The floor rail may also be replaced by two rails or another arrangement, on which the transfer device moves along a desired path. The lifting carriages are typically moved by means of electric motor control and chain traction. The electric motors and their controls are also used for moving the whole transfer device. The power supply and the control signals are provided from the outside, for example from a process control system.

In the embodiment of FIG. 1, the lifting carriage 2 is equipped with load manipulating devices, by which the load can be transferred from the rack 3 to the lifting carriage 2 and back. In this case, the load manipulating means is a slide 5 with an endless chain 6 provided with two pins 7, wherein they can be used to manipulate cassettes 8 on both sides of the aisle and to grip the cassette 8. As already mentioned above, in one embodiment of the invention, only the slide 5 is arranged to be elevated, wherein the chain 6 and the pin 7 are elevated with it. Instead of a pin 7, it is possible to apply other grippers of prior art, wherein they do not necessarily need to rise with the slide 5 but they may move independently. Furthermore, with reference to FIG. 2, the pin 7 circulating with the chain 6 engages in a slot or gap 9 in the cassette 8, and after that, the cassette 8 can be pulled by the pin 7 onto the lifting carriage 2, when the pin 7 moves with the horizontal section of the chain 6. In this case, the movement of the chain of the slide and the movement of the slide 5 are coupled to each other in a linear manner, wherein the maximum travel of the slide 5 is about 250 mm. By means of the movement of the slide 5, an even support surface formed on the upper surface of the slide 5 can be brought underneath the idler 10 in the front part 8a of the cassette 8, or alternatively, an idler is provided on the top surface of the slide 5 and its front part 5a, to be placed under the front part 8a of the cassette without a wheel. The first mentioned structure provides a very low construction, wherein the distance between the cassettes 8 in the vertical direction may be even very small, as long as the protruding part 5a of the slide 5 extends underneath the idler 10 of the cassette 8.

In this case, grippers or pins 7 are provided at both ends of the lifting carriage 2, that is, on both sides of the cassette, and the movements of the pins are synchronized, for example, by means of a transverse shaft. The movement of the slide 5 is provided by means of a toothed wheel coupled to the same shaft with e.g. a large chain wheel, and by means of a toothed bar coupled under the slide 5. The slide 5 is mounted onto the frame of the lifting carriage 2. The chain wheel, the toothed bar and the toothed wheel are integrated in a drive motor 11 for the slide.

Figure 2:
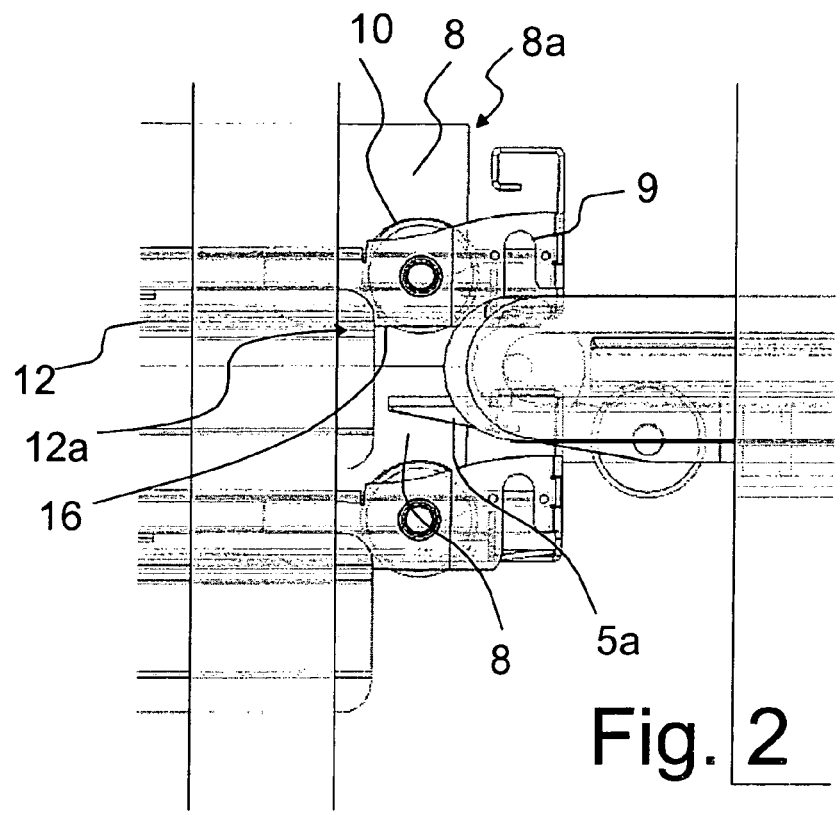
FIG. 2 is a side view showing an initial situation, in which the cassettes are in the rack.
Figure 3:
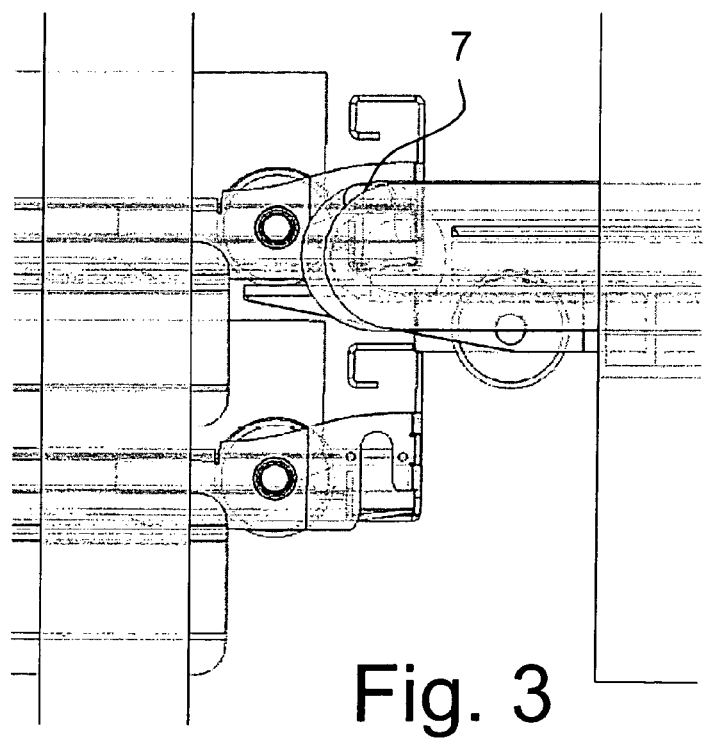
FIG. 3 illustrates the transfer of a slide underneath the cassette.

The cassette 8 is transferred onto the lifting carriage 2 in the following way. As shown in FIG. 2, the lifting carriage 2 is driven to a height, at which the withdrawn slide 5 (i.e. the upper surface of the slide, used as a support), is on a slightly lower plane than the idler 10 of the cassette 8 (or at the height level normally used by the transfer device and the slide 5). As shown in FIG. 2, the slide 5 is driven out so that the slide 5 is placed under the idler 10 by an approaching movement, i.e., typically between cassettes 8 placed on top of each other, and the pin 7 is placed at a slot 9 in the cassette 8, underneath the slot. The lifting carriage 2 is lifted (or, alternatively, only the slide 5 is lifted), wherein the pin 7 moves into the slot 9 and the front wheel 10 of the cassette 8 is placed onto the slide 5 and onto its support, as shown in FIG. 3. In this embodiment, the front part 8a of the cassette 8 and simultaneously its front idler 10 are placed so that the idler 10 is not placed onto the support 12 of the rack 3 but it is suspended freely in the air, wherein its underside is freely accessible. As to the structure, the support 12 is for example a support surface having an L-shape and an even upper surface, on which the idlers of the cassette may roll. The supports 12 are placed by both sides of the cassette 8, and they are normally mounted in the vertical frame of the rack 3. In this case, the idler 10 is placed further out than the end 12a of the support for the rack, but it can also be placed further in, if the idler 10 is narrower than the supports 12. The slide 5 of the lifting carriage must be placed by the idler 10 for the idler to roll along the upper surface of the slide 5. The chain 6 is rotated to move the cassette 8, pulled by the pin 7, onto the slide 5, and simultaneously the whole slide 5 is pulled onto the lifting carriage 2, as shown in FIG. 4.

Figure 4:
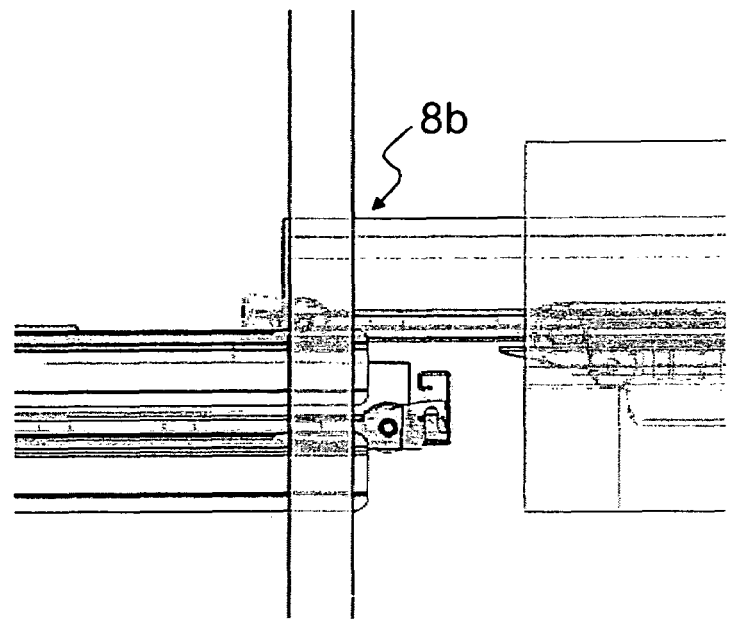
FIG. 4 shows the lifting of the cassette.
Figure 5:
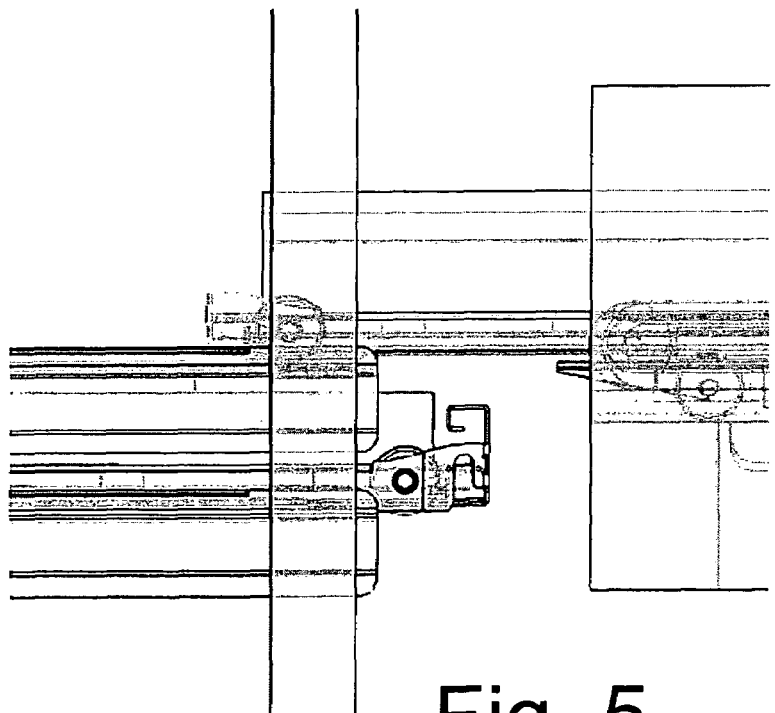
FIG. 5 shows the transfer of the cassette onto the transfer device.
Figure 6:
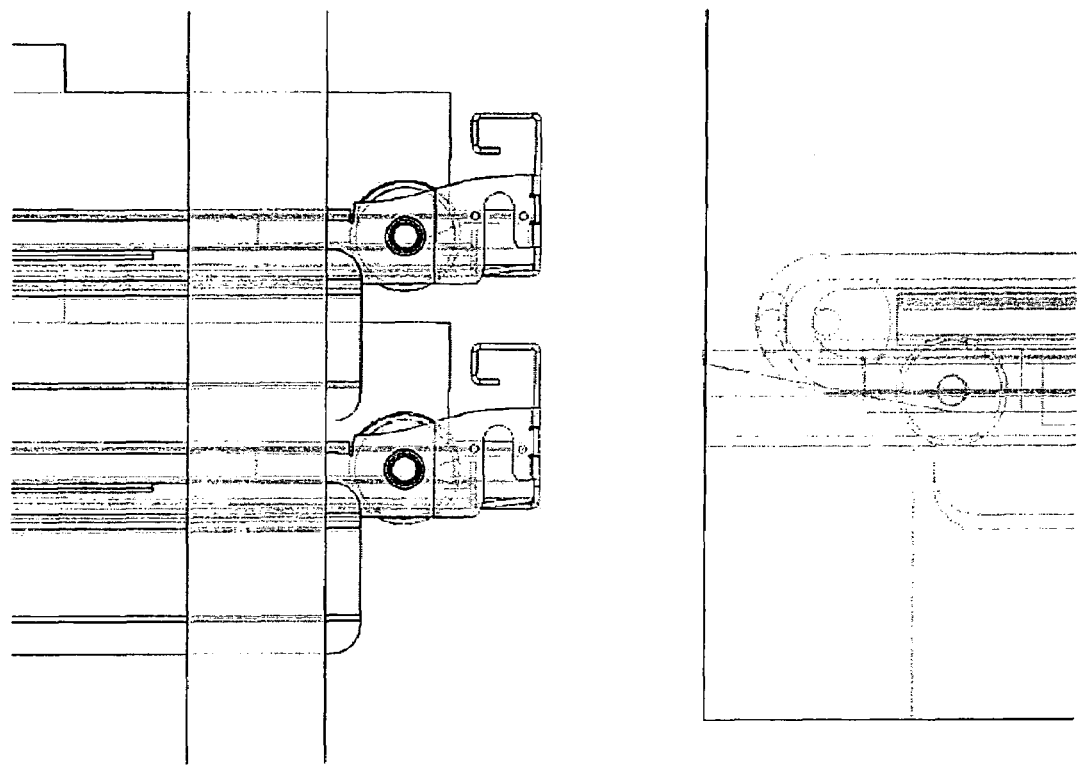
FIG. 6 shows the lifting of the cassette at the final stage of the transfer.

When the cassette 8 has been moved almost entirely onto the slide 5 of the lifting carriage and its idler 14, as shown in FIG. 4, but the rearer idler 13 of the cassette 8 is still on the support 12 of the rack, a lifting movement is made by the lifting carriage 2 (or an additional lifting movement is made with by slide 5), as shown in FIG. 5. The rearer idler 13 rises off the support 12, and the cassette 8 is now entirely supported by the lifting carriage 2, on the support of the idlers 14 and 10. The idler 14 is in the front part of the slide, in a location onto which the rear part 8b of the cassette is placed. At the opposite end of the slide 5, an idler 15 is provided, which is needed if cassettes are manipulated on both sides of the aisle. The idler 10 of the cassette 8 is needed if cassettes 8 are manipulated on both sides of the aisle, wherein it can be utilized as described above. The front part 8a of the cassette and the front part 5a of the slide may also be without idlers, but in such a case the front part 8a of the cassette must be pulled onto several idlers of the slide 5, wherein it is advantageous that the front part 5a is also provided with an embedded idler for elevating the cassette 8. The cassette 8 is now pulled entirely onto the lifting carriage 2.

By moving the slide 5 of the lifting carriage 2 directly underneath the front idler 10, after which the idler 10 rolls along the slide 5, and by making a lifting movement before the rear idler 13 is moved into the lifting carriage 2, collisions of the idler 13 with the ends of the support 12 or failings into the gaps are avoided, wherein the transfer of the cassette 8 is smooth. In the cassette 8, a minimum number of support rolls will be needed, 1 or 2 rolls for each side, wherein it will not be necessary to install rolls in the support 12 of the rack, which saves costs and installation work. The support rolls 14, which are embedded in the upper surface of the slide 5 of the lifting carriage and on which the cassette 8 is transferred, are arranged narrower than the foremost support rolls 10 of the cassette 8. Even in this case, few support rolls are needed, maybe only one roll for each side of the cassette, if the cassette 8 has a rear support roll 13 and a front support roll 10. The need may be two rolls for each side, and consequently a total of four rolls in the lifting carriage, if cassettes 8 are transferred on both sides of the lifting carriage 2. The support rolls 14, 15 are placed at the initial and rear ends of the slide 5.

The leaving of the cassette 8 in the rack 3 takes place in the reverse order. The rearmost idler 13 of the outwards protuding cassette 8 is lowered onto the support 12 of the rack, and the cassette 8 is pushed out of the lifting carriage 2, but not so much that it would fall off the slide 5 of the lifting carriage 2 and particularly off its front part 5a. The lifting carriage 2 (or the slide 5) is lowered further, wherein the idler 10 is lowered, lower than the upper surface of the support 12 of the rack 3, or at least the cassette 8 is placed, with respect to its bottom 16 or other structures, onto the support 12, wherein it remains easily, by means of frictional forces, stationary in its position, and simultaneously the foremost support roll 10 is not placed onto the support 12 but remains freely suspended. The slide 5 is retracted to the lifting carriage 2. In one embodiment, the support roll 10 is placed onto the support 12, and the remaining or locking of the cassette 8 in its position is secured by other means, but still at least part of the lower surface of the support roll 10 is free to be placed against the rising slide 5 and the upper surface of its front part 5a.

By means of the lowering movements according to the above-presented method, the cassette can be lowered softly into the rack, wherein even cassettes having a weight of 150 to 200 kg and a load having a weight of 1000 to 3000 kg can be manipulated safely and without damaging the structures. The system presented in the figures also makes the construction simpler and makes it possible to utilize the above-presented methods when the cassette is taken from the rack or moved back into it.

The invention is not limited solely to the embodiments shown in the above examples. The embodiments shown in the figures illustrate partly simplified principles. In other respects, the structure and construction of the cassette and the lifting carriage comply with structural, principles known or obvious as such. Instead of a cassette, it is also possible to use other suitable bases or pallets, but in particular, it is a so-called plate cassette or tray intended for the storage of steel plates and sheets of variable sizes, to be transported from a storage to the location of manipulation where the plates are manipulated, for example one by one, or for example by means of robots or manipulators, for various purposes. A typical example is an automatic warehouse system. In other respects, the selection of the components and actuators of the lifting carriage is obvious and known as such for a person skilled in the art, e.g. on the basis of the description above. It is also obvious that instead of grippers, i.e. a chain and a pin fixed to it, also other grippers of prior art can be applied, which grip the cassette by various techniques and pull or push it. However, the presented embodiment and the integration with the slide is preferable and simple in its function, wherein the number of actuators can be reduced. Consequently, the ascending and descending movement of the slide used in the invention is produced either by moving the whole frame structure or the lifting carriage, as in the case of a stacker crane, or by moving the slide and the related structures and possible actuators only, as in the case of some transfer devices. The embodiments of the invention may vary within the scope of the features described in the following claims.

The invention claimed is:

1. A fully automated method for manipulating a cassette with an automatic transfer device, a front part of the cassette comprising a first support roll, a rear part of the cassette comprising a second support roll, wherein the cassette is for supporting materials while being transported and stored, the transfer device comprising a slide provided with a lifting and a lowering movement, the slide further being transferrable in a horizontal direction, and grippers for gripping the cassette and pulling the cassette onto the slide, the method comprising:

keeping the slide at a height at which the slide is transferrable underneath the first support roll of the cassette placed on a support in a rack, wherein the rack comprises a vertical frame, the support being mounted to the vertical frame and providing a storage location for the cassette, transferring the slide underneath the first support roll of the cassette, lifting the slide until the first support roll of the cassette is placed onto the slide, and continuing the lifting until the first support roll of the cassette is elevated and supported on the slide, pulling the cassette by the grippers along the support onto the slide keeping the second support roll of the cassette placed against the support, wherein the first support roll of the cassette moves along the slide as the second support roll moves along the support of the rack, elevating the cassette by lifting the slide while keeping the second support roll of the cassette still positioned against the support, until the cassette and a full weight of the cassette have been transferred onto the slide, wherein the first support roll rolls along the slide when the cassette is pulled onto the slide or pushed back into the rack, and wherein an underside of the first support roll is freely accessible by the slide for lifting when the cassette rests in the rack, and pulling the cassette onto the slide.

2. The method according to claim 1, wherein the slide comprises a roll, against which the cassette is supported when the cassette is transferred onto or off the slide.

3. The method according to claim 1, wherein the transfer device further comprises a lifting carriage in which the slide is placed, wherein the slide is lifted and lowered by moving said lifting carriage.

4. A fully automated method for manipulating a cassette with an automatic transfer device, a front part of the cassette comprising a first support roll, a rear part of the cassette comprising a second support roll wherein the cassette is for supporting materials while being transported and stored, the transfer device comprising a slide provided with a lifting and a lowering movement, the slide further being transferrable in a horizontal direction, and grippers for gripping the cassette and pulling the cassette onto the slide, the method comprising:

supporting the cassette on the slide, keeping the slide at a height at which the cassette is transferrable to a rack but higher than a level of a support in the rack, wherein the rack comprises a vertical frame, the support being mounted to the vertical frame and providing a storage location for the cassette, pushing a rear part of the cassette by the grippers above the support and supporting the cassette by the slide when the cassette moves, lowering the slide until the second support roll of the cassette is placed onto the support and the cassette is capable of moving simultaneously along the support and along the slide, pushing the cassette with the grippers into the rack and keeping a first support roll of the cassette placed against the slide, wherein the first support roll of the cassette moves along the slide as the second support roll of the cassette moves along the support of the rack into the rack, lowering the slide and the cassette while keeping the first support roll of the cassette still placed against the slide, until the cassette and a full weight of the cassette have been transferred onto the support, wherein the first support roll rolls along the slide when the cassette is pulled onto the slide or pushed back into the rack, and wherein an underside of the first support roll is freely accessible by the slide for lifting when the cassette rests in the rack, and wherein the first support roll is not placed on the support of the rack, and retracting the slide.

5. The method according to claim 4, wherein the transfer device further comprises a lifting carriage in which the slide is placed, wherein the slide is lifted and lowered by moving said lifting carriage.

6. A fully automated storage and manipulation system for manipulating and transferring cassettes, wherein a front part of the cassettes comprises a first support roll, a rear part of the cassettes comprises a second support roll, and wherein the cassettes are for supporting materials while being transported and stored, the system comprising:

a rack for storing cassettes and equipped with supports on which the cassettes rest and along which the cassettes are transferred, wherein the rack comprises a vertical frame, the supports being mounted to the vertical frame and providing a storage location for the cassettes, an automatic transfer device comprising a slide onto which the cassettes are transferred and which can be transferred in a horizontal direction and which is provided with a lifting and lowering movement, and grippers for gripping the cassettes and moving the cassettes onto or off the slide, wherein the cassettes are supported on the rack, the slide is configured to be placed underneath the first support roll, which is also not placed on a support in the rack and, by a lifting movement, to elevate the first support roll of the cassette in such a way that the cassette can be transferred along the support onto the slide, keeping the second support roll of the cassette simultaneously supported by the support and to further elevate the cassette by lifting the slide until the cassette and a full weight of the cassette has been transferred onto the slide, wherein the cassette is on the slide, the slide is further configured, during the transfer of the cassette into the rack, to push the rear part of the cassette above a support in the rack and, by a lowering movement, to lower the second support roll of the cassette onto the support in such a way that the cassette can be transferred along the support, keeping the first support roll of the cassette simultaneously supported by the slide, wherein the first support roll of the cassette moves along the slide as the second support roll of the cassette moves along the support of the rack into the rack, and to further lower the cassette by lowering the slide until the cassette and the full weight of the cassette have been transferred onto the support, and wherein the first support roll is not placed on the support, wherein the first support roll is configured to roll along the slide when the cassette is pulled onto the slide or pushed back into the rack, and wherein the underside of the first support roll is arranged to be freely accessible by the slide for lifting when the cassette rests in the rack.

7. The system according to claim 6, wherein the transfer device further comprises a lifting carriage in which the slide is placed, wherein the slide is lifted and lowered by moving said lifting carriage.

* * * * *

UNITED STATES PATENT AND TRADEMARK OFFICE
CERTIFICATE OF CORRECTION

PATENT NO. : 7,661,920 B2
APPLICATION NO. : 11/094149
DATED : February 16, 2010
INVENTOR(S) : Kantola et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1017 days.

Signed and Sealed this

Thirtieth Day of November, 2010

David J. Kappos
*Director of the United States Patent and Trademark Office*